US009563988B2

(12) United States Patent
Drew et al.

(10) Patent No.: US 9,563,988 B2
(45) Date of Patent: Feb. 7, 2017

(54) VEHICLE TUNER AND DISPLAY MODULE AND DOCKING STATION

(75) Inventors: Michael Drew, Dexter, MI (US); Brian Herron, Dexter, MI (US)

(73) Assignee: DREW TECHNOLOGIES, Ann Arbor, MI (US)

(*) Notice: Subject to any disclaimer, the term of this patent is extended or adjusted under 35 U.S.C. 154(b) by 258 days.

(21) Appl. No.: 12/973,050

(22) Filed: Dec. 20, 2010

(65) Prior Publication Data

US 2011/0153150 A1 Jun. 23, 2011

(51) Int. Cl.

| | |
|---|---|
| ***B60R 25/10*** | (2013.01) |
| ***B60Q 1/00*** | (2006.01) |
| ***G01M 17/00*** | (2006.01) |
| ***G06F 7/00*** | (2006.01) |
| ***G06F 11/30*** | (2006.01) |
| ***G06F 19/00*** | (2011.01) |
| ***G07C 5/00*** | (2006.01) |
| ***G07C 5/08*** | (2006.01) |

(52) U.S. Cl.
CPC ......... *G07C 5/0808* (2013.01); *G07C 2205/02* (2013.01)

(58) Field of Classification Search
CPC . B60K 35/00; B60K 37/02; B60K 2350/1064; B60K 2350/1072; B60K 37/06; B60K 2350/203; B60K 2350/901; B60K 2350/1004; B60K 2350/1024; B60K 2350/1028; B60K 2350/106; B60K 2350/108; B60K 2350/403; B60K 2350/1016
USPC ............................... 340/438–456; 701/29–36
See application file for complete search history.

(56) References Cited

U.S. PATENT DOCUMENTS

| | | | | |
|---|---|---|---|---|
| 5,365,436 | A | 11/1994 | Schaller et al. | |
| 5,764,139 | A | 6/1998 | Nojima et al. | |
| 5,794,164 | A * | 8/1998 | Beckert | B60R 11/02 455/3.06 |
| 5,819,201 | A | 10/1998 | DeGraaf | |
| 5,859,628 | A * | 1/1999 | Ross et al. | 345/173 |
| 6,246,935 | B1 * | 6/2001 | Buckley | B60K 35/00 340/425.5 |
| 6,282,464 | B1 * | 8/2001 | Obradovich | 701/1 |
| 6,393,379 | B1 * | 5/2002 | Gumbel | 702/183 |
| 6,633,482 | B2 | 10/2003 | Rode | |

(Continued)

OTHER PUBLICATIONS

Merriam-Webster Dictionary definition of appearance, Captured Dec. 4, 2010, Acessed Mar. 5, 2014, pp. 1-2.*

(Continued)

*Primary Examiner* — Emily C Terrell
(74) *Attorney, Agent, or Firm* — Brinks Gilson & Lione

(57) ABSTRACT

A data acquisition, data display, vehicle computer interface and programming tool in the form of a module. The module of the present invention can be set into a dock, which is connected to the vehicle's control modules. The vehicle can be reprogrammed to accept vehicle manufacture's updates and/or performance updates. Once the reprogramming is finished the module is removed from the dock and is be placed into/onto the vehicle's dashboard or other location readily viewable by the vehicle operator to report one or more of the vehicle's operating parameters. The present invention is readily connectable to a vehicle's data link for bi-directional communication with the various control modules on the vehicle.

17 Claims, 10 Drawing Sheets

(56) References Cited

U.S. PATENT DOCUMENTS

| | | | | |
|---|---|---|---|---|
| 6,667,726 | B1 | 12/2003 | Damiani et al. | |
| 6,690,268 | B2 | 2/2004 | Schofield et al. | |
| 6,816,760 | B1 | 11/2004 | Namaky | |
| 6,919,822 | B2 | 7/2005 | Tanaka et al. | |
| 7,012,727 | B2 | 3/2006 | Hutzel et al. | |
| 7,116,216 | B2 | 10/2006 | Andreasen et al. | |
| 7,184,887 | B2 | 2/2007 | Wood et al. | |
| 7,257,468 | B1 | 8/2007 | Costa et al. | |
| 7,286,857 | B1 * | 10/2007 | Walker et al. | 455/569.2 |
| 7,317,386 | B2 | 1/2008 | Lengning et al. | |
| 7,382,237 | B2 | 6/2008 | Stoschek et al. | |
| 7,444,216 | B2 | 10/2008 | Rogers et al. | |
| 7,460,950 | B2 | 12/2008 | Wurth | |
| 7,548,491 | B2 * | 6/2009 | Macfarlane | 367/198 |
| 7,571,034 | B2 | 8/2009 | Raichle et al. | |
| 7,573,706 | B2 | 8/2009 | Carnevali | |
| 7,786,851 | B2 | 8/2010 | Drew et al. | |
| 7,809,482 | B2 | 10/2010 | Bertosa et al. | |
| 7,928,837 | B2 | 4/2011 | Drew et al. | |
| 8,400,288 | B2 * | 3/2013 | Bowden et al. | 340/438 |
| 8,547,298 | B2 * | 10/2013 | Szczerba et al. | 345/7 |
| 9,002,313 | B2 * | 4/2015 | Sink | B60Q 1/2611 340/691.1 |
| 2002/0007306 | A1 * | 1/2002 | Granger et al. | 705/14 |
| 2002/0049538 | A1 | 4/2002 | Knapton et al. | |
| 2003/0128504 | A1 * | 7/2003 | Enners | B60R 11/02 361/679.41 |
| 2004/0155524 | A1 * | 8/2004 | Acker et al. | 307/10.1 |
| 2005/0107925 | A1 * | 5/2005 | Enigk et al. | 701/1 |
| 2005/0114007 | A1 * | 5/2005 | Pillar et al. | 701/82 |
| 2006/0271246 | A1 | 11/2006 | Bell et al. | |
| 2007/0032950 | A1 | 2/2007 | O'Flanagan et al. | |
| 2007/0078598 | A1 * | 4/2007 | Watanabe et al. | 701/211 |
| 2007/0124043 | A1 | 5/2007 | Ayoub et al. | |
| 2007/0185627 | A1 | 8/2007 | Mavreas | |
| 2007/0185631 | A1 * | 8/2007 | Yeh et al. | 701/36 |
| 2008/0150709 | A1 | 6/2008 | Yamamoto et al. | |
| 2009/0043446 | A1 | 2/2009 | Drew et al. | |
| 2009/0184812 | A1 | 7/2009 | Drew et al. | |
| 2010/0127847 | A1 * | 5/2010 | Evans et al. | 340/461 |
| 2010/0204878 | A1 | 8/2010 | Drew et al. | |

OTHER PUBLICATIONS

Definition of "format," Oxford Dictionary, Accessed Jul. 9, 2014.*

MP3 CAR website forum, Internet, http://www.mp3car.com/engine-management-obd-ii-engine-diagnostics-etc/75148-software . . . .

MP3 CAR website forum, http://www.classic-web.archive.org/web20041211005835, www.mp3car.com/store/.

Drew Technologies, Inc., "CarDAQ-plus user manual", Revised. (May 6, 2005).

Drew Technologies, Inc., "Vehicle interfaces: reflash, diagnostics, and engineering interfaces", (2007).

Drew Technologies, Inc., "Drewtech.com News: Toyota announces techstream compatibility with mongoose® mfc", (Nov. 2009).

Diesel Power, "104 more horsepower", p. 186-188,189, http://www.dieselpowermag.com, (Aug. 2007).

* cited by examiner

VEHICLE TUNER AND DISPLAY MODULE AND DOCKING STATION

FIELD OF THE INVENTION

The present invention generally relates to an electronic gauge, diagnostic, and programming module and docking device for use in a motor vehicle, and more particularly to an electronic diagnostic docking device which can be used in conjunction with a vehicle's computer and user configured display system for acquisition of information regarding vehicles and vehicle performance so that updated information and performance standards can be set to a vehicle's computer.

BACKGROUND OF THE INVENTION

Modern vehicles are generally equipped with numerous sensors, such as, for example, oil pressure, coolant temperature, transmission temperature, engine temperature, steering position, air/fuel ratio, etc. Typically, the sensors are connected to an on-board computer control module that continually monitors the sensors and regulates the vehicles functions accordingly. Generally the information generated by the sensor is continually passed along the vehicle data link as part of the vehicle diagnostic system. The vehicle diagnostic system cooperates with the factory installed gauge cluster to provide the vehicle operator with information regarding various components of the vehicle. The vehicle diagnostic system typically includes one or more separate computer control modules. Examples of such computer control modules (also known as just "modules") are: a power train control module (PCM), an engine control module (ECM), a transmission control module (TCM), an antilock brake system (ABS) control module, and an air bag control module. Typically the computer control modules are connected together by a data link, forming the vehicle diagnostic system. The data link typically has a connection point, or data link connector (DLC) that is normally located under the dash of the vehicle. The vehicle diagnostic system is generally used to provide relevant information to repair technicians. The DLC provides a place to connect off-board vehicle gauges and diagnostic devices, such as scan tools and code readers, for communication with the vehicle diagnostic system.

In addition to downloading the information regarding the operation or performance of various vehicle components, the data link connectors can also be used to upload information to the various vehicle control modules. The operating parameters and/or software of the various vehicle control modules can be changed or updated. This operation is commonly referred to as "flashing" the control module. The control modules can be flashed to upgrade the performance of the vehicle, to reduce powertrain emissions, fix drivability issues, or to compensate for wear of certain components, such as engine components.

DESCRIPTION OF THE PRIOR ART

"Off-board devices," such as scan tools and code readers are known in the art. Scan tool and code reader testing devices interface with vehicle diagnostic systems to access, display, and/or print vehicle diagnostic information. On-Board Diagnostics Version II (OBD II) Scan Tools are one commonly known type of scan tool and are governed by a number of standards, e.g., SAE J1978 Rev. 1998-02, SAE J1979 Rev. 1997-09, ISO9141/KWP2000, CAN/ISO15765, SAE J1850 PWM, SAE J1850 VPW or the like.

A "Manufacturer-Specific Scan Tool" is a scan tool that accesses and displays proprietary manufacturer-specific data (and possibly also additionally accesses and displays OBD II data). Examples of proprietary manufacturer-specific data include Device Controls, On-Demand Tests, Actuator Tests, Sensor Tests, Interrogator, and Read Temporary Codes. In general, air bag data, ABS data, cruise control data, and climate control data are also considered to be proprietary manufacturer-specific data and are typically included only in Manufacturer-Specific Scan Tools.

Technicians at automobile dealerships and repair shops now days need the ability to reprogram the software contained in the vehicle's onboard computer. These reprogramming requirements normally reflect changes recommended by the automobile manufacturer. Software changes can also be utilized to improve a vehicle's performance. Reprogramming was initially adopted by the aftermarket in 2002 when the Society of Automotive Engineers SAE standard J2534 was published. In 2004 this standard was modified to J2534-1 thus technicians and customers had to purchase new hardware to use this new standard.

However, the scan tools are often large, cumbersome wheeled devices that set outside of the vehicle with cables extending into the vehicle. Portable scan tool devices are also known; these devices are generally not constructed for permanent installation within a vehicle; nor are they generally equipped for connection to, and collection of data from, peripheral devices. These scan tools are designed for use by automobile technicians.

Therefore, there exists a need for an electronic diagnostic docking device which can be used in conjunction with a vehicle's computer to test and program vehicles. This device can be physically and electronically or wirelessly connected to a similar device which contains updated information regarding vehicles and vehicle performance so that updated information and performance standards can be set to a vehicle's computer. The device can collect information from multiple busses and senders within a vehicle that can communicate with a display device, such as a gauge, and display the information. There also exists a need for an electronic device which can be readily used by a car owner or automobile enthusiast.

SUMMARY OF THE INVENTION

Briefly, the present invention is directed toward a data acquisition, data display, vehicle computer interface and programming tool in the form of a module. The module of the present invention can be set into a dock, which is connected to the vehicle's control modules. The vehicle can be reprogrammed to accept vehicle manufacture's updates and/or performance updates by the use of buttons and an extended user interface. The dock can also be used to perform enhanced diagnostics of the vehicle and/or engine. It can also be employed to extend configurations of the operating parameters of the vehicle. Once the reprogramming is finished, the module is removed from the dock and is be placed into/onto the vehicle's dashboard or other location readily viewable by the vehicle operator to report one or more of the vehicle's operating parameters. The present invention is readily connectable to a vehicle's data link for bi-directional communication with the various control modules on the vehicle.

The module is also configured so that the user can design his/her own gauge display "skins" in the form of graphics, graphs, fonts, needles, buttons, program generated objects and backgrounds that can be stored and recalled for display on the module. Input signals from the various control modules and sensors on the vehicle can be assigned to a specific gauge skin or to a specific display contained within a gauge skin.

The module of the present invention can also be configured for automatic skin changes in response to ambient light conditions and may additionally change background color, font size and shape, and/or sound alarms based on the signal values received from the vehicle's data link.

The module of the present invention can also include a wireless connection, such as Cellular, GSM, Bluetooth, WiFi or the like, which can be utilized for connection to various control modules, docking devices, sensors or peripheral devices on the vehicle.

Accordingly, it is an objective of the instant invention to provide a vehicle diagnostic/programming module and gauge which can be readily installed in a vehicle.

It is a further objective of the instant invention to provide a vehicle diagnostic/programming display module which provides bi-directional communication between the module and the on-board control modules, sensors and other vehicle peripherals.

It is yet another objective of the instant invention to provide a vehicle diagnostic/programming display module which can accept input from a technician or vehicle operator while specific vehicle control modules are being reprogrammed or flashed.

It is a still further objective of the instant invention to provide a vehicle diagnostic/programming display module which includes a dock that includes inputs for programming, configuring the vehicle diagnostic/programming display module or inputting data into the control modules of a vehicle.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
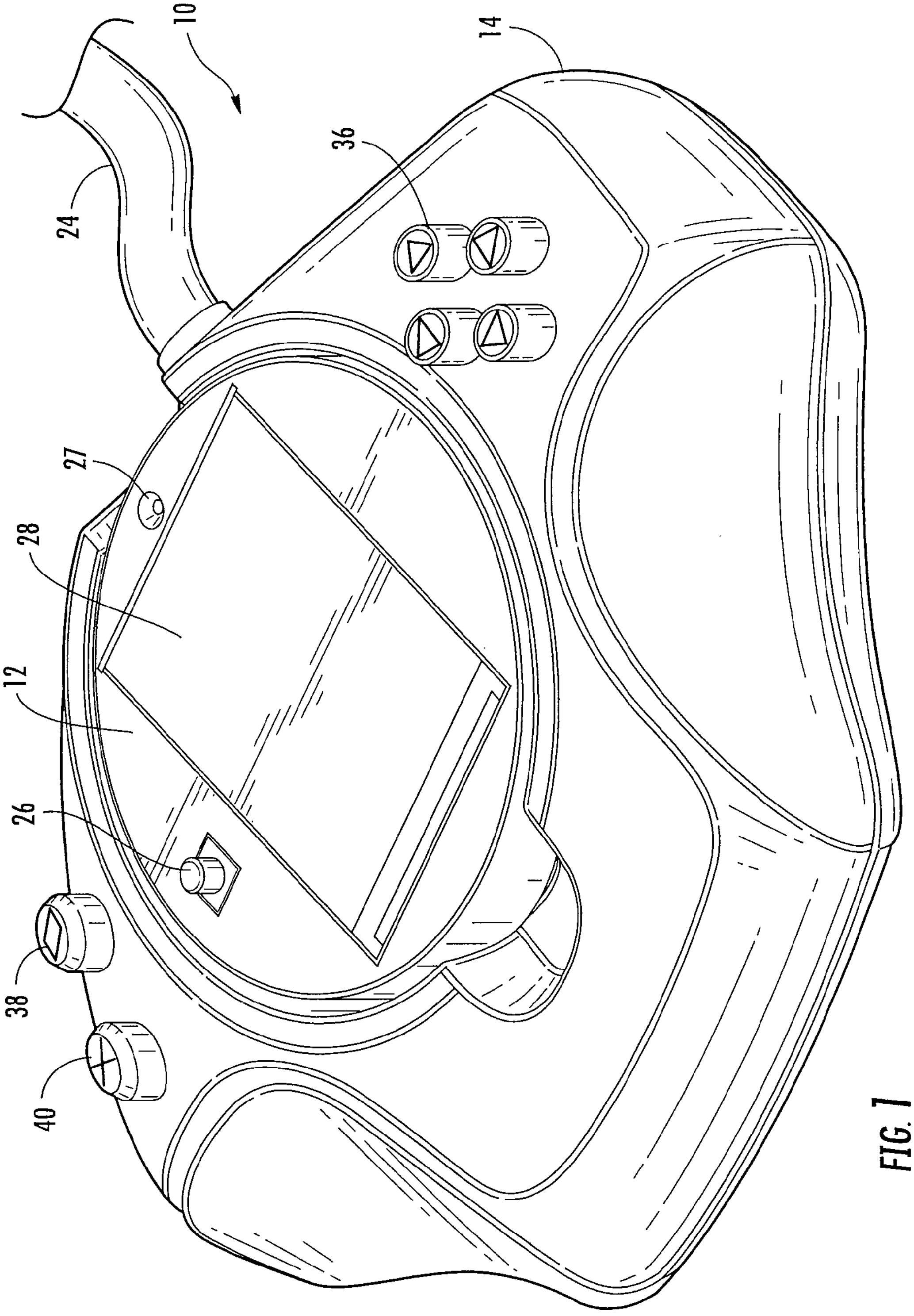
FIG. 1 is a front perspective view of a diagnostic/programming display module installed in a dock of the present invention.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Figure 10:
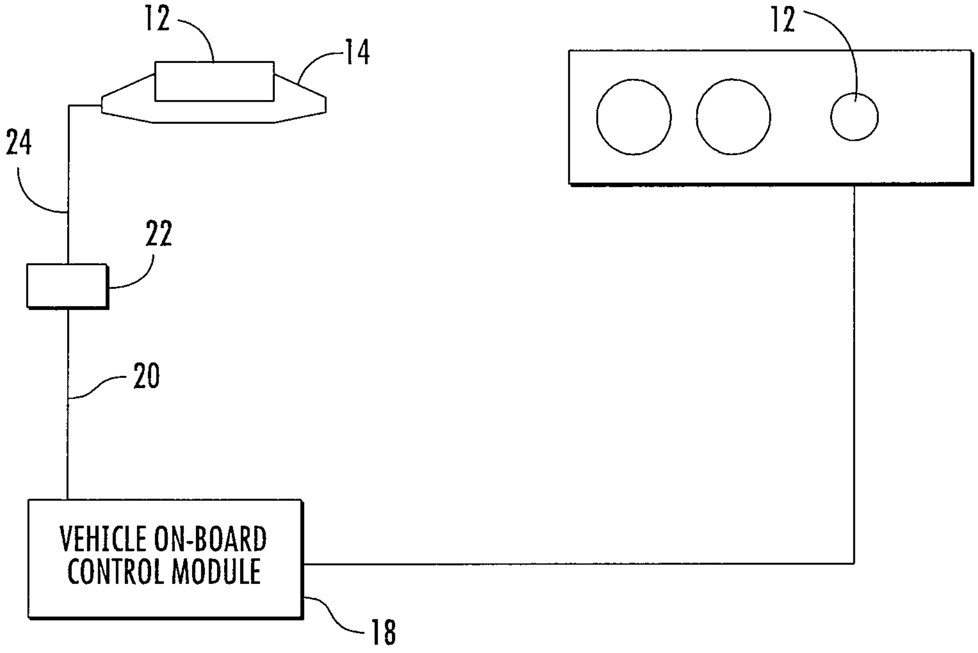
FIG. 10 is a schematic view of the present invention connected to an on-board control module of a vehicle.

Referring now to FIGS. 1-10, the present invention will now be described. As illustrated in FIGS. 1 and 10, the present invention 10 includes a diagnostic/programming/gauge display module 12 which can be removable secured into a dock 14. The module 12 is connected to a vehicle's on-board control modules 18 via a data link cable. The vehicle's data link cable 20 is connected to a data link connector or port 22. Preferably the data link connector 22 is a 16 pin connector such as an OBD II connector. The data link connector can also be any other type of connector used on vehicles which enable a technician or vehicle operator to communicate with the vehicle's on-board control modules. Another data link cable 24 is connected between the connector 22 and the dock 14 of the present invention. The module 12 can also be directly connected to the vehicle using a data link cable in place of the dock 14.

The diagnostic/programming display module 12 performs multiple functions. Primarily, it communicates with the on-board control modules of a vehicle to supply information from the various components of the vehicle, such as the engine, transmission, braking system, etc. to the operator of the vehicle. It can also supply the aforementioned information plus diagnostic information to a technician who will be repairing the vehicle. In today's vehicles, whenever there is an abnormal operating condition, the on-board control modules generate a code which indicates the abnormal condition. If the abnormal condition requires the attention of a service technician, the vehicle's computer is programmed to light a "check engine" light. This indicates to the vehicle operator that the vehicle should be brought in for service. The service technicians have the proper tools to read and interpret the vehicle codes. These tools are commonly called scan tools.

The diagnostic/programming display module 12 can also display various operating parameters of the vehicle. For example, engine parameters such as water temperature and oil pressure can be displayed on module 12. In addition, other vehicle operating parameters such as transmission temperature and brake fluid pressure can be displayed. A control button 26 on the diagnostic/programming display module is utilized to select the various functions which the module can perform including display of vehicle operating parameters on the screen 28 of the display module 12. The display module also includes an LED 27 light which can be programmed to serve as a warning light or perform other functions.

The display module 12 can be secured into a dock 14 whenever the display module is utilized for diagnostic and/or programming functions. When the present invention is utilized in this mode, the display module 12 is inserted into dock 14 and the dock is connected to the data link of a vehicle via cable 24. The cable 24 can be of a length sufficient so a service technician does not have to sit in or enter a vehicle to service the vehicle. In many instances it is inconvenient and undesirable for a service technician to have to enter the passenger compartment of a vehicle to perform the required service on the vehicle. In certain instances the service technician must take extra precautions to keep the passenger compartment of the vehicle clean while he/she is working under and around very dirty portions of the vehicle. By having a data link cable 24 of a sufficient length the technician can observe the display module 12 while working on almost any part of the vehicle.

Figure 2:
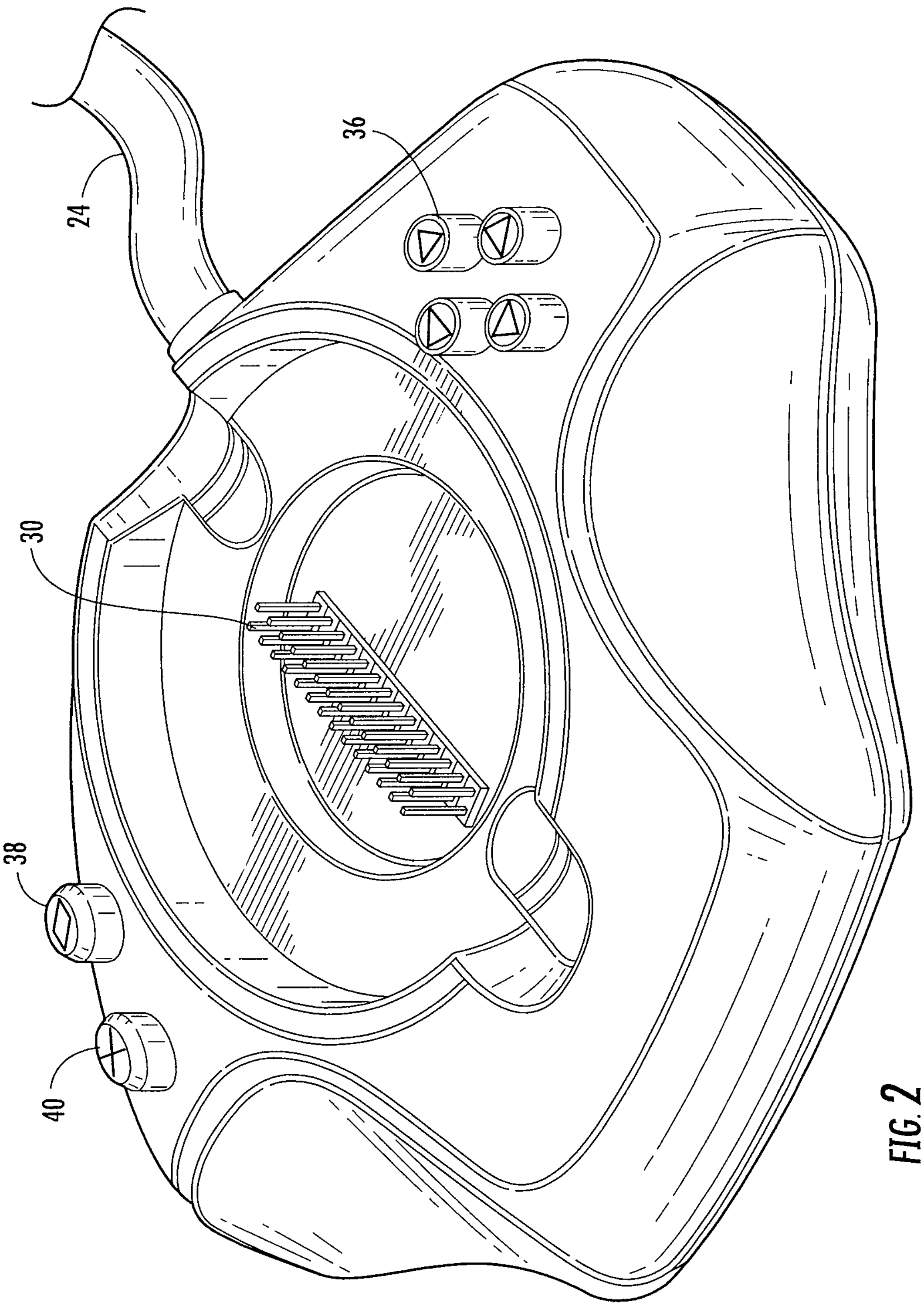
FIG. 2 is a front perspective view of the dock without the diagnostic/programming display module.
Figure 4:
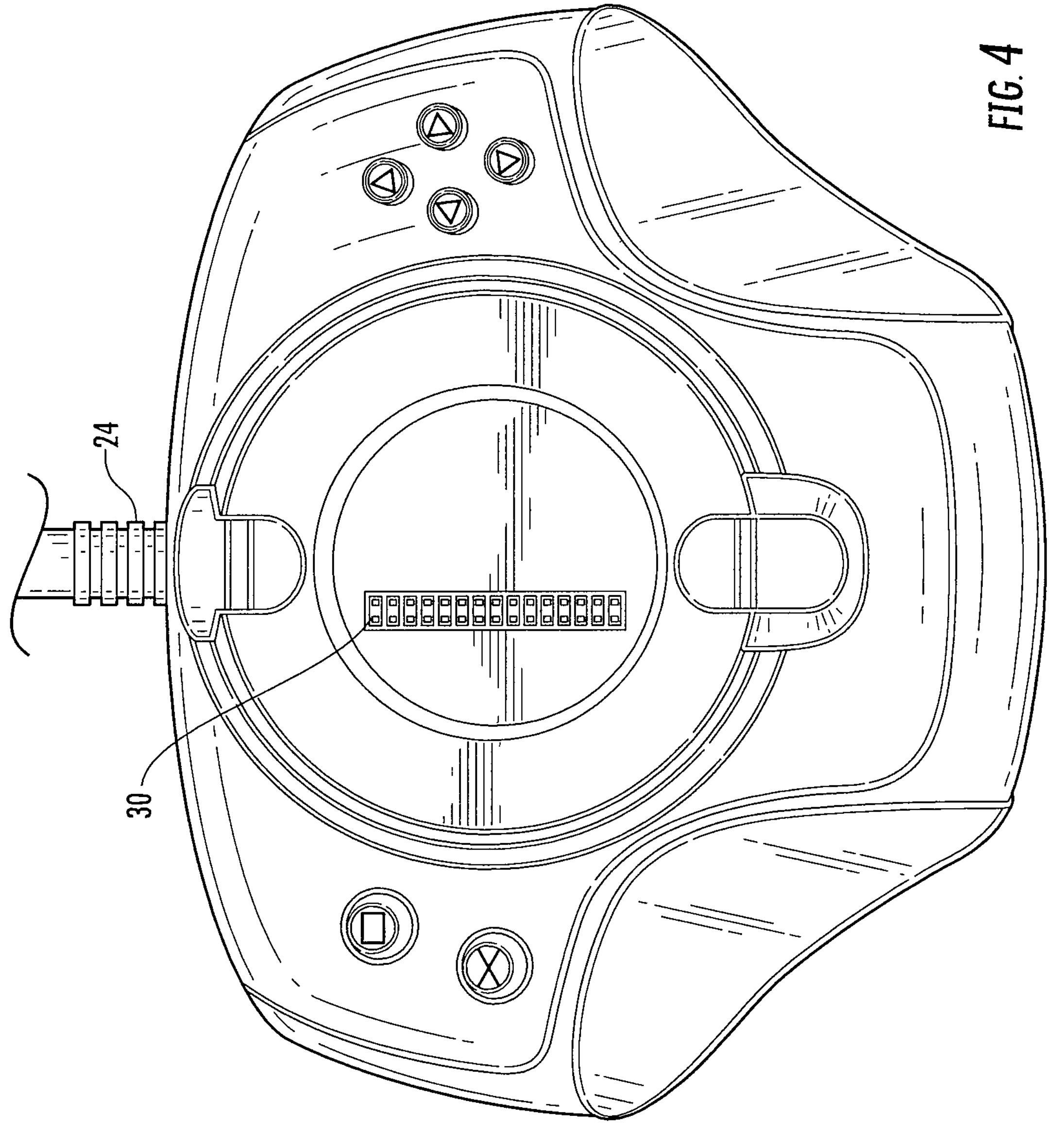
FIG. 4 is a top view of the dock without the diagnostic/programming display module.
Figure 5:
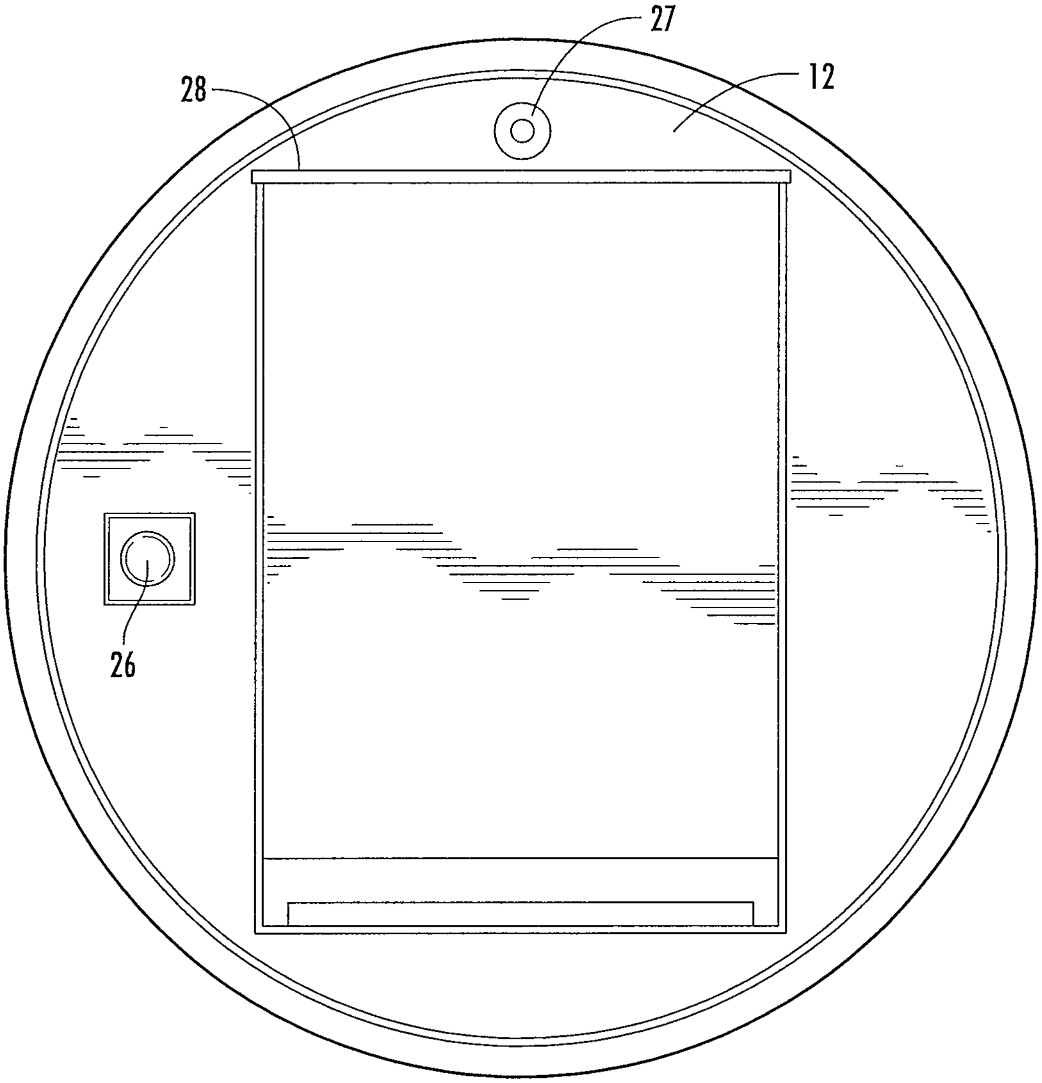
FIG. 5 is a top view of the diagnostic/programming display module.
Figure 6:
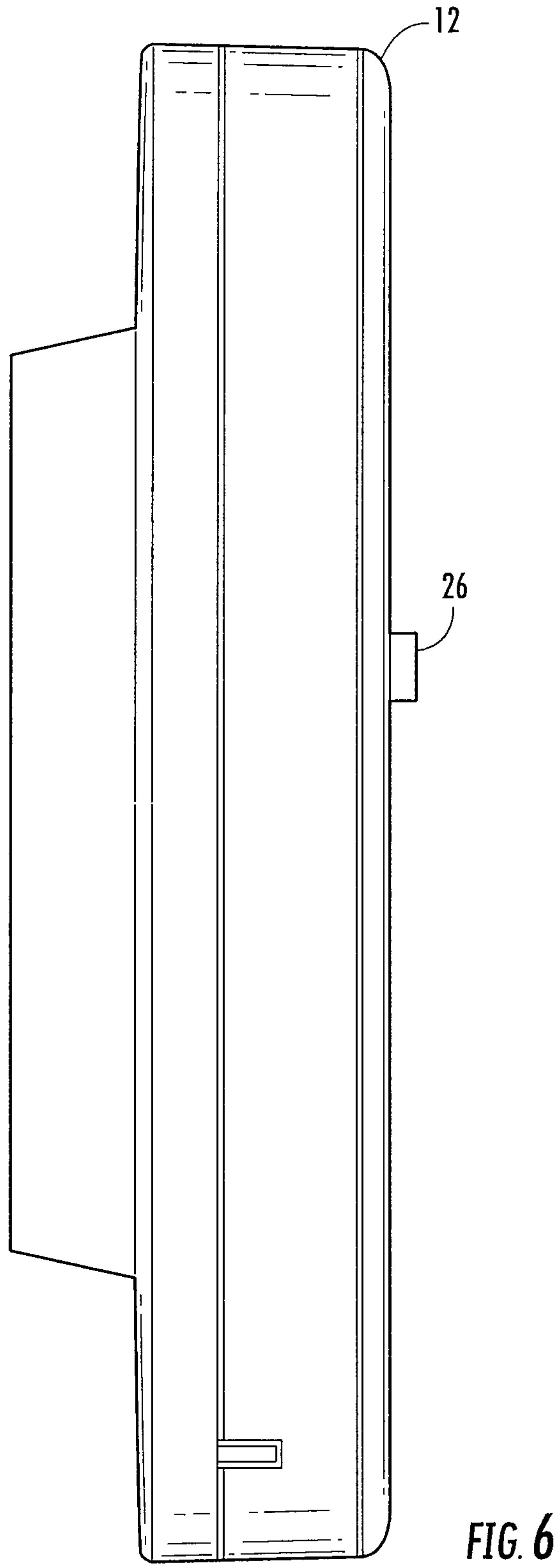
FIG. 6 is a side view of the diagnostic/programming display module.
Figure 7:
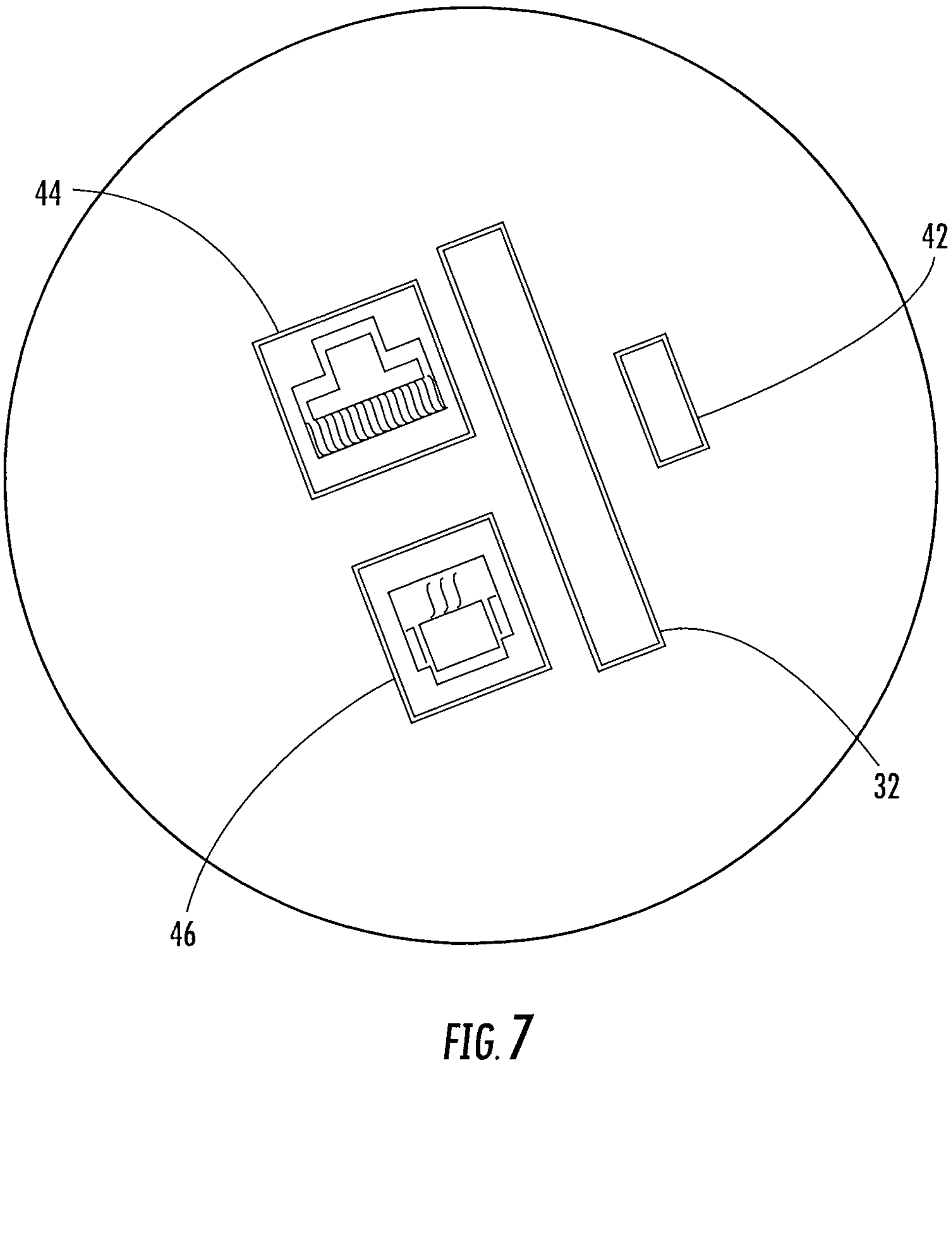
FIG. 7 is a rear view of the diagnostic/programming module and gauge only.
Figure 8:
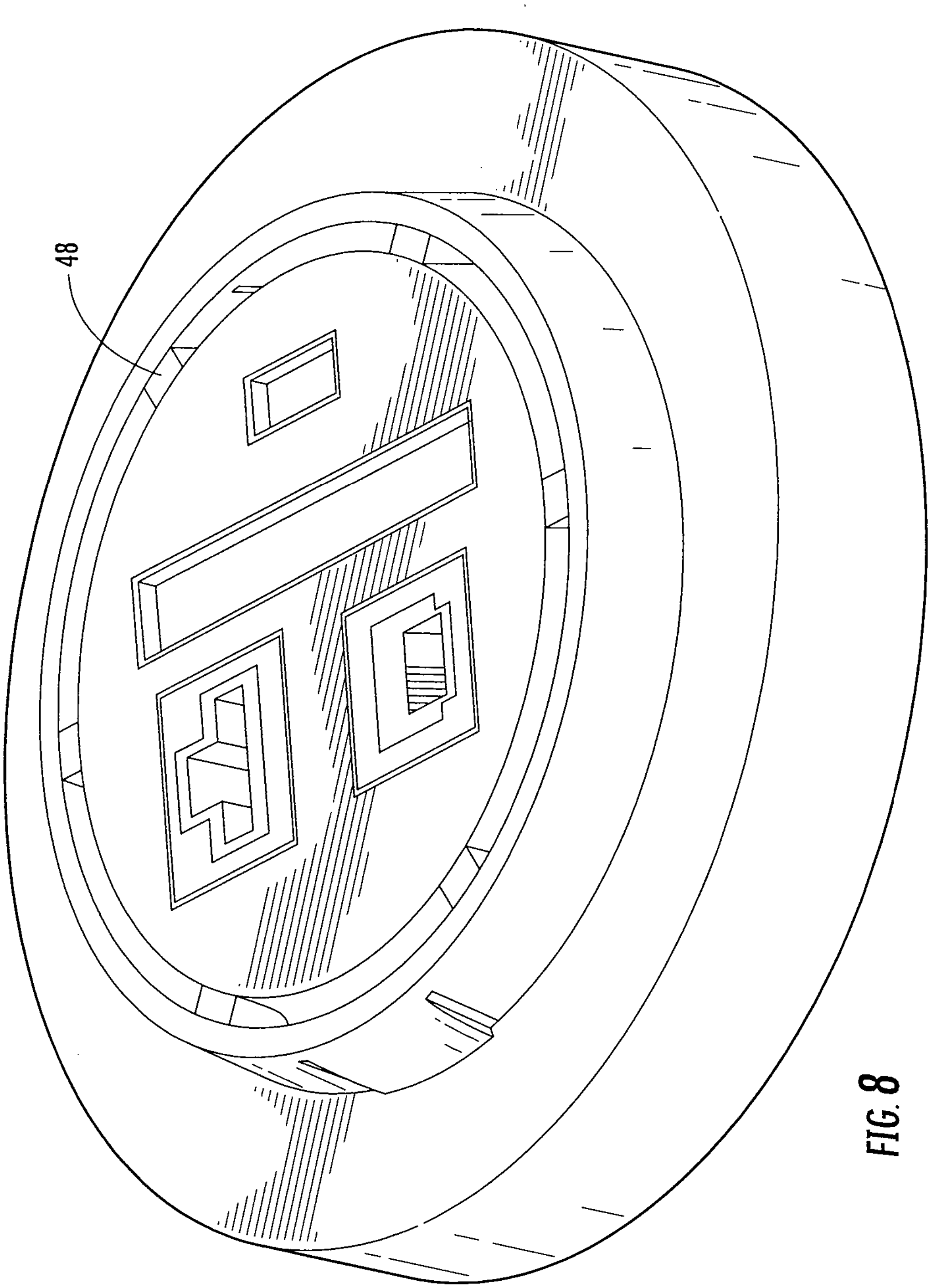
FIG. 8 is a rear perspective view of the diagnostic/programming display module with an adapter ring installed.
Figure 9:
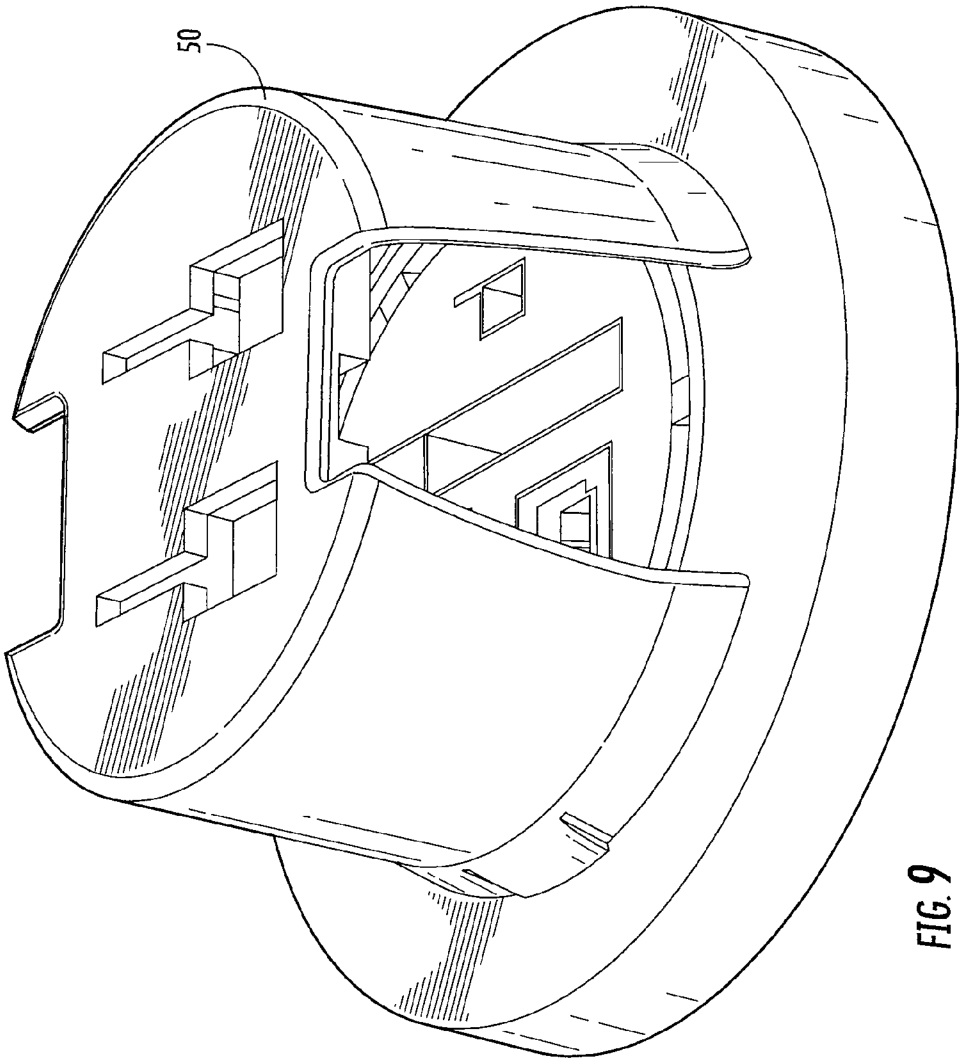
FIG. 9 is a rear perspective view of the diagnostic/programming display module with an adapter for a T slot connection.

As illustrated in FIGS. 2 and 4, cable 24 communicates with the display module 12 through connectors 30. These connectors are similar to the connector found in OBD II connection or port. In the event that the present invention was to be utilized on a non U.S. vehicle, the connectors 30 may need be different. They would need to conform to the data port connection employed by the manufacturer of the vehicle. Connectors 32 on the display module 12, FIG. 7, receive the connectors 30 and allow bi-directional transmission of data between the display module 12 and the control modules of a vehicle.

Figure 3:
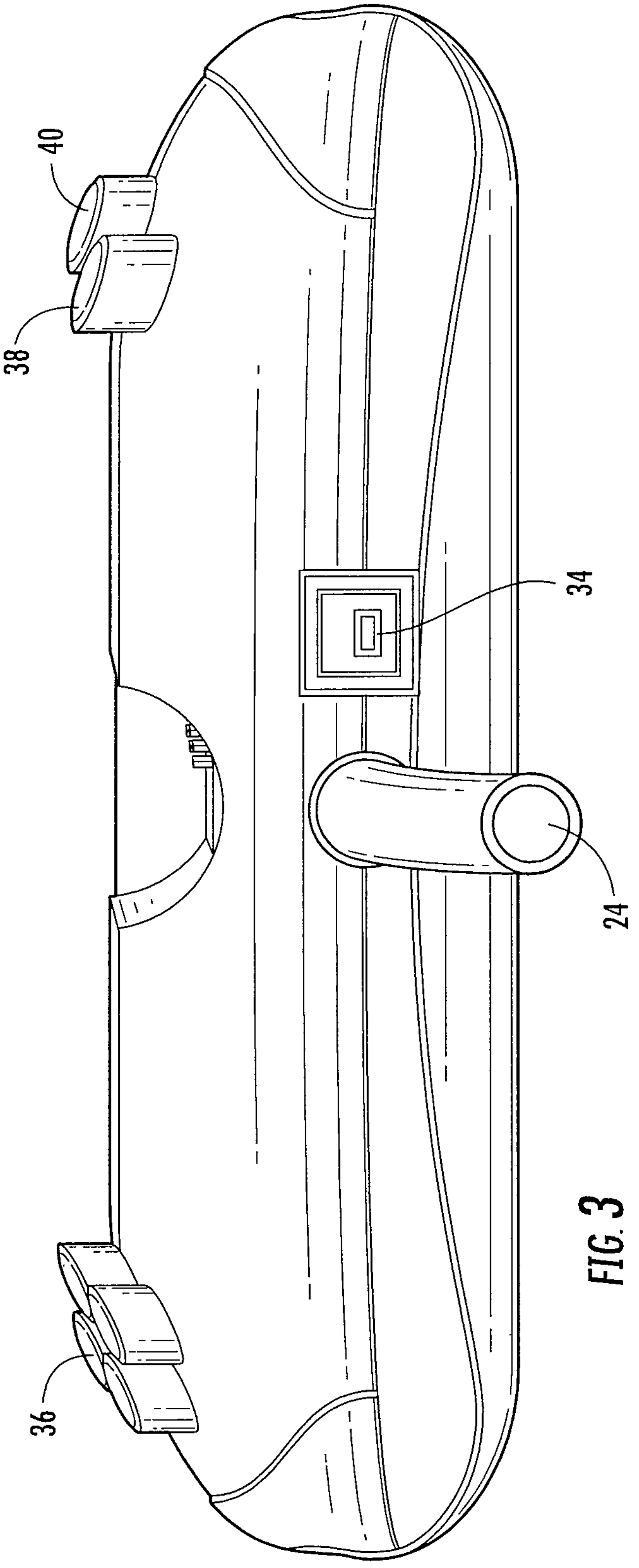
FIG. 3 is a front view of the dock without the diagnostic/programming display module.

Connector 34, FIG. 3, is used to download programming updates and/or modifications for the vehicle's control modules to the display module 12. Connector 34 can be any type of connector, such as a USB connector, which would enable the display module 12 to communicate with a device that has a programming update or modification for the control modules of the vehicle. Whenever the display module 12 is being reprogrammed, updated or "flashed", buttons 36, 38 and 40 may be used in conjunctions with these updates or modifications. Buttons 36, 38 and 40 can also be employed to download all or portions of updates or modifications to a vehicle's control modules. The computer within the display module can be utilized to transmit the reprogramming or updating to the various vehicle control modules.

The control module updates or modifications can also be wirelessly transmitted to the dock 14. The dock can be equipped with a cellular telephone, GSM, Bluetooth® or WiFi connection, such as a 802.11. Also, the display module 12 can be equipped with a cellular telephone, GSM, Bluetooth® or WiFi connection which would enable the communications and reprogramming and/or update to be wirelessly transmitted directly to the display module 12 without the need for the dock 14. An application similar to the ones available on phones such as iPhones®, cellular smart phones, iPads®, tablet PCs, tablet media players, or other mobile computing platforms could also be utilized on the display module 12 to wirelessly receive vehicle control module updates or modifications. iPhones®, smart phones, iPads®, tablet PCs or other mobile communicating devices could be used in place of the display module 12. The information would be transmitted wirelessly between these devices and the dock. The owner of the vehicle or the technician could subscribe to a service so that monthly, quarterly or whenever updates are available, these updates would automatically be wirelessly transmitted to the display module 12.

After the vehicle control modules have been updated or "flashed", the display module 12 of the present invention is removed from dock 14 and placed into or onto the dashboard of the vehicle or in an area viewable by the driver. A data link connector is connected to one of the various connectors 32, 42, 44 or 46 on the rear of the display module 12. A data link cable can also be connected directly to connectors 44 or 46. This would eliminate the need to connect the module 12 to the dock 14. The data link provides information from the vehicle's control modules which can be displayed on the screen 28 of the display module 12. The control button 26 can be used to control the display. For example, control button 26 can be used to toggle between various engine or vehicle parameters. It can also be used to format the presentation of the data on the screen 28, or to turn on/off recording of the data. The format of the presentation of the data is also known as the "skin".

The display module 12 preferably is available in one standard size. Adaptor rings 48 and 50, FIGS. 8 and 9, can be secured to the display module which would enable the installation of module 12 into different vehicles. Adaptor 48, for example, would permit module 12 to be installed into an opening larger in diameter than the rear portion of module 12. Adaptor 50 would enable module 12 to be installed in a T-slot type of installation. Hook and loop fasteners and double sided tape could also be utilized to mount display module 12 to a vehicle. In addition to the data link connections on the rear of module 12, there could be additional connections to provide electrical power to the module 12 for functions such as illumination of the display. Thus the module 12 can be readily installed and removed from both the dock 14 and the vehicle.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A data acquisition, display and transmission module for displaying and transmitting information within a vehicle comprising:

a display module constructed and arranged to be secured within said vehicle, said display module including a display module computer and a display monitor in electrical communication with each other, said display module including at least one vehicle connection port in electrical communication with said display module computer;

a dock constructed and arranged to receive and retain said display module, said dock including communication devices which enable bi-directional communication between said display module and control modules in said vehicle of data relating to said vehicle, said display module including communication devices which enable bi-directional communication between said display module and said dock, whereby said control modules in said vehicle can be programmed with updated software;

wherein said control modules in said vehicle are a powertrain control module or an engine control module;

wherein at least one control on said display module also controls the appearance of at least one gauge which displays an operating parameter of said vehicle and the appearance of a format of the at least one gauge displayed by the display module, wherein the format includes a skin, the skin being in the form of graphics, graphs, fonts, needles, buttons, program generated objects or backgrounds;

wherein the display module computer is configured to program said control modules in said vehicle when the display module is retained by the dock;

wherein the display module computer is configured to allow for the displaying at least one gauge which displays an operating parameter of said vehicle via the display monitor when the display module is not retained by the dock; and wherein the dock comprises a primary cavity configured to receive the display module wherein the dock comprises a secondary cavity that connects to the primary cavity, the secondary cavity being smaller than the primary cavity, the secondary cavity configured to allow for the removal of the display module when the display module is mounted within the dock; and wherein the dock comprises a tertiary cavity that connects to the primary cavity, the tertiary cavity being smaller than the primary cavity, the tertiary cavity configured to allow for the removal of the display module when the display module is mounted within the dock.

2. The data acquisition, display and transmission module of claim 1 wherein said display module includes at least one control which controls the display of the operating parameters of said vehicle when the display module is not retained by the dock.

3. The data acquisition, display and transmission module of claim 1 including a hard wire connection between said display module and at least one of said control modules of said vehicle.

4. The data acquisition, display and transmission module of claim 3 wherein said hard wire connection is the same when said display module is mounted in said dock and when said display module is mounted in a dashboard of said vehicle.

5. The data acquisition, display and transmission module of claim 1 including an adaptor releasably secured to said display module, said adaptor constructed and arranged to releasably secure said display module in a dashboard of said vehicle when the display module is not retained by the dock.

6. The data acquisition, display and transmission module of claim 1 including an adaptor releasably secured to said display module, said adaptor including at least one T-slot connection.

7. The data acquisition, display and transmission module of claim 1 including an adaptor releasably secured to said display module, hook and loop type fasteners securing said adaptor to a dashboard of said vehicle.

8. The data acquisition, display and transmission module of claim 1 wherein said dock includes at least one control which controls the receipt of data from an outside source and distribution to said vehicle control modules.

9. The data acquisition, display and transmission module of claim 1 wherein said dock includes a wireless connection which communicates vehicle data between a source of vehicle data and said dock.

10. The data acquisition, display and transmission module of claim 9 wherein said wireless connection is a wireless connection selected from the group consisting of cellular, GSM, WiFi and Bluetooth.

11. The data acquisition, display and transmission module of claim 1 wherein said display module includes a wireless connection which communicates vehicle data between said dock and display module.

12. The data acquisition, display and transmission module of claim 11 wherein said wireless connection is a wireless connection selected from the group consisting of cellular, GSM connections, WiFi and Bluetooth.

13. The data acquisition, display and transmission module of claim 1 wherein said display module is a smart phone, a cellular telephone, a tablet PC, a mobile PC, or other mobile computing platform with applicable software.

14. The data acquisition, display and transmission module of claim 1 where the operator is provided with calibration updates thru a wired connection as a subscription service.

15. The data acquisition, display and transmission module of claim 1 where the operator is provided with calibration updates thru a wireless connection as a subscription service.

16. The data acquisition, display and transmission module of claim 13 where the operator is provided with calibration updates thru a wired connection as a subscription service.

17. The data acquisition, display and transmission module of claim 13 where the operator is a provided with calibration updates thru a wireless connection as a subscription service.

* * * * *